Nov. 19, 1968 F. H. ROSADO ET AL 3,412,216

COMBINATION RECORD-REPRODUCE AND ERASE MAGNETIC HEAD

Filed Jan. 13, 1965 2 Sheets-Sheet 1

INVENTORS
FERDINAND ROSADO
DAVID A. TRIBBEY

BY

Fisher, Christen, Dabot & Caldwell

ATTORNEYS

COMBINATION RECORD-REPRODUCE AND ERASE MAGNETIC HEAD

Filed Jan. 13, 1965 2 Sheets-Sheet 2

INVENTORS
FERDINAND ROSADO
DAVID A. TRIBBEY

BY

Fisher, Christen, Dabbs & Caldwell
ATTORNEYS 3,412,216
COMBINATION RECORD-REPRODUCE AND ERASE MAGNETIC HEAD Ferdinand H. Rosado and David A. Tribbey, Rio Piedras, Puerto Rico, assignors to Headmaster Electronics Corporation, Santurce, Puerto Rico, a corporation of Puerto Rico Filed Jan. 13, 1965, Ser. No. 425,254
9 Claims. (Cl. 179—100.2)

ABSTRACT OF THE DISCLOSURE

A true combination magnetic head comprising a casing having a plurality of longitudinal slots and a transverse slot spaced from the longitudinal slots, an erase head housing including a neck portion having a plurality of erase gaps disposed therein, the neck portion being indexed to the transverse slot, a read-record housing including a plurality of hollow ridge portions each having a read-record gap disposed therein, the plurality of hollow ridge portions being indexed to the longitudinal slots, and a terminal board common to the erase head housing and the read-record housing and adapted to anchor the housings by being inserted in recessed tracks in the housings.

The subject invention appertains to magnetic transducers in general, and, more particularly, to a combination head for performing the three basic functions—namely, read, record and erase—necessary to present day magnetic heads.

Essentially, the combination head of the present invention incorporates integral alignment of the read and record gap or gaps to the erase gap or gaps without any sacrifice of isolation and in a structure taking full advantage of factory alignment accuracy.

While certain features of the subject combination head are applicable to single track or monaural uses, the invention will be described in connection with its preferred embodiment for application to quarter-track (dual) stereo systems.

Thus, a pair of read-record gaps is disposed in lateral spaced apart relation at the slightly arcuate operative face of the head. Longitudinally spaced therefrom, and in lateral alignment therewith, is a pair of erase gaps (pair of double gaps) such that the respective tape tracks encounter separate read-record and erase gaps with the gaps for each track being in precise predetermined mutual relation with respect to gap heighth, gap azimuth and gap-to-gap track or longitudinal alignment.

The present invention provides the foregoing advantages by incorporating an erase head section along with a read-record section within a common outer shield or casing in predetermined orientation thereto and to a common supporting terminal board. Accurate built-in indexing relates from the terminals of the terminal board to the gaps of the erase and read-record sections as to all alignment.

This integral related alignment to factory tolerances is achieved by employing mated semi-housings to comprise each section. Each housing includes indexing shoulders and neck portions near the upper or gap forming ends thereof adapted to seat against the peripheries of accurately disposed spaced slots in the operative face of the common shield or casing with the necks fitting therethrough for subsequent finishing away. It may be appreciated that the casing can be precisely shaped and sloted through punch and die techniques and the respective sections accurately cast or punched to relate the sections to the overall casing.

Specifically, in the preferred embodiment, a pair of longitudinal slots, in spaced apart relation in the operative face of the casing, receives or indexes the dual gap structures of the read-record section and a further slot transversely disposed in the operative face and uniformly spaced from and in symmetrical relation to the longitudinal slots, indexes the gap structure of the erase section.

Each section further includes depending flange-like portions along its outer or lateral edges which are recessed to form a track for receiving opposing edges of the common terminal board thereby anchoring or indexing the lower ends of the sections. Also, the widths of the sections are dimensioned to snugly conform with the interior width of the casing. The casing is open at the bottom to permit the sections assembled to the terminal board entrance for tightly fitting the interior of the casing when the respective shoulders are fitted against the interior surface of the operative face and the necks penetrate it via the slots.

The gap forming structure is in turn indexed to the respective sections through the provision of conforming recesses within the mated half housings for receiving the pole piece structures which actually define the gaps. The recesses each lie in multiple surfaces of the interiors of the respective sections to positively orient the pole pieces relative to the external shoulders and necks of the sections which index to the outer casing.

Certain unique internal structures are employed to insure the necessary accurate indexing. For example, the read-record mated semi-housings include a pair of hollow spaced apart ridges in communication with the recesses for receiving the upper portions of the pole pieces which become the gap defining sections. The read-record pole pieces are preferably substantially pentagon configuration. Thus, it may be appreciated that the hollow ridges, when abutted, define a pair of spaced apart upside down V-shaped recesses which locate the uppermost portions of the pole pieces in this region. The opposite or lower ends of the pole pieces are abutted together within electrical coils, along with conventional shimming, and their leads connected to pins of the terminal board.

The erase section also includes a novel pole piece structure adapted for accurate indexing with its housing. A folded over substantially U-shaped magnetic pole piece is adapted to fit within recesses of the mated semi-housings with the folded over portion extending upwardly to the open neck and shoulder region of the section. The lower ends of the pole piece structure are turned inwardly for abutting engagement with elongated magnetic pole piece shims which extend upwardly, through the neck region, via cuts or slots in the magnetic pole piece material.

Non-magnetic spacers partially surround the shims to comprise the spaced apart double gaps. Electrical coils are disposed on the elongated shims within the pole piece U-shaped configuration to provide flux paths through the respective shims in opposite directions to the folded over leg portions of the pole piece material. The accurate indexing is effected by the precise location of the slots in the folded over pole piece which in turn is indexed to the erasing section by the internal conforming recesses of the erase housing.

In final assembly the erase section is separated from the read-record section by magnetic and electrically insulating separators with the sections being contiguous with the separators and compacted to snugly fit within the casing. The casing is then filled with epoxy or the like and after it has hardened, the necks of the sections and upper extremities of the pole piece structures are finished off to gap positions in the arcuate operative face.

Thus, it will be appreciated that when the terminals of the terminal board engage a socket, the gaps in the operative face are automatically positioned in proper alignment in all respects.

With the foregoing in mind, it is among the objects of the invention to provide a true combination head wherein all three basic functions are achieved by a compact structure contained within a single casing and incorporating integral gap alignment.

Another object of the invention is the provision of such a combination head construction to take advantage of factory accuracy derived from punch and die techniques.

A still further object of the invention is the provision of a combination head wherein each gap is indexed to the terminals as well as to each other gap, and A still further object of the invention is the provision of a compact and isolated combination head in which unique gap pole piece structures are indexed to their respective housings, in turn indexed to a common casing.

The invention will be better understood from a reading of the following detailed description thereof, in the light of the accompanying drawing which illustrates a preferred embodiment in which.

Figures 1, 2:
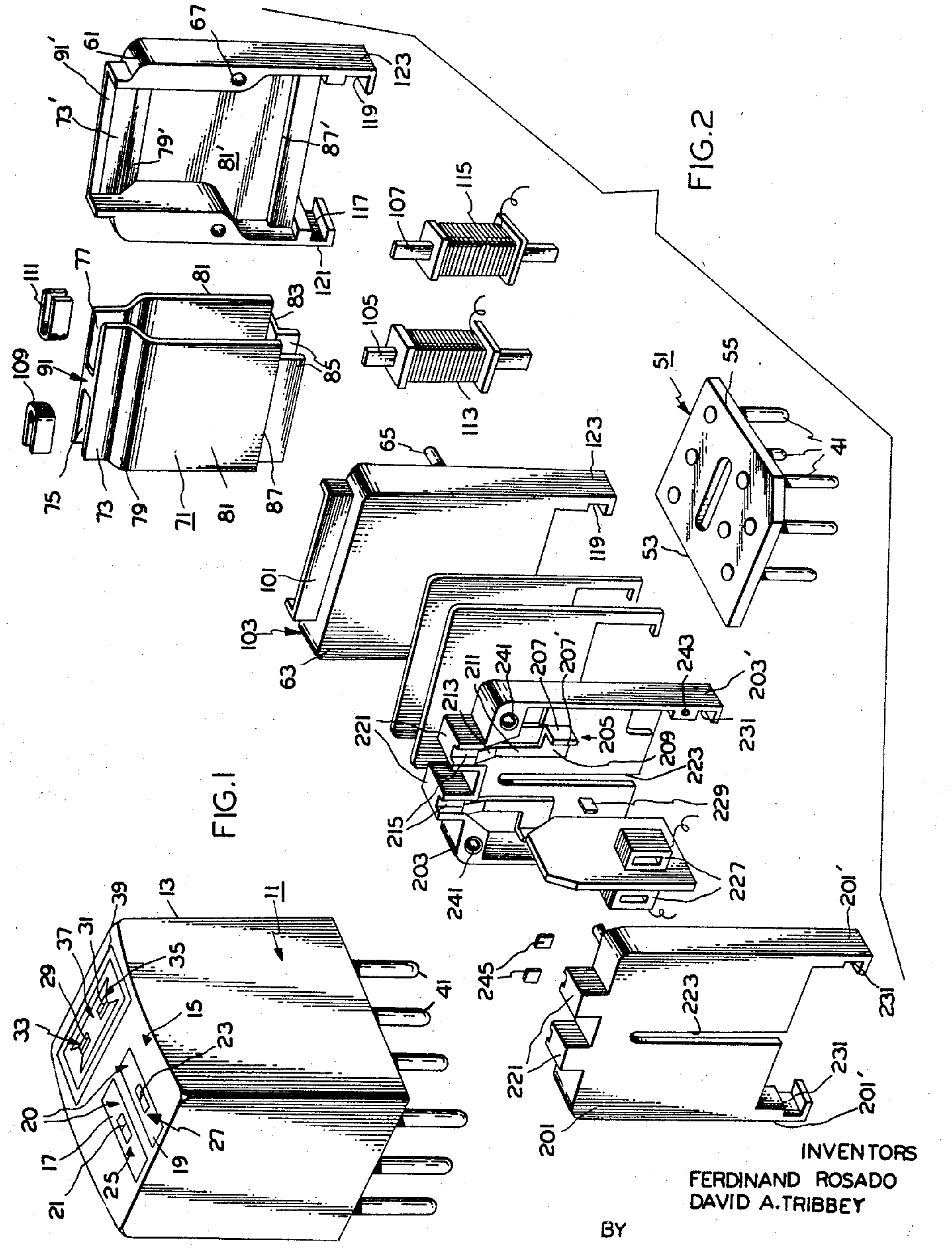
FIG. 1 is a view in perspective of the true combination head of the preferred embodiment of this invention.
FIG. 2 is an exploded view depicting the components assemblable into the read-record and the erase sections of the invention.

Referring now to the drawings, there is shown in FIG. 1 a compact combination head 11 capable of the basic functions of read-record and erase. The outer casing 13 of the head 11 is of magnetic material, preferably of commercially available high permeability type. The operative face 15 of the head is slightly arcuate in the longitudinal direction to accommodate tape wrap. A pair of laterally spaced apart parallel slots 17 and 19 essentially determine the tracks where the read-record function is performed. The dual read-record gaps are indicated by the lines 21, 23 which are formed by the visible portions of the pole pieces 25 and 27. The read-record section 20 is visible through the slots 17 and 19.

In longitudinal alignment with, and with proper azimuth and heighth relative thereto, are the erase gaps 29 and 31 (which are preferably each double gaps). The erase gaps are formed by the erase pole piece structures 33 and 35 respectively. The erase head section is visible at 37 as being indexed by the slot 39.

The head 11, with the integrally aligned slots, is adapted for location in an instrument through the plug-in pins, such as 41, indexed thereto and in electrical connection with the coils of the respective sections.

The internal structure comprising the head 11 is best depicted in FIG. 2 wherein the pins 41 are shown set in or affixed to a phenolic or other insulating terminal board 51. This terminal board includes opposing edges 53 and 55 which will be received by the structures to be anchored in the casing 11, as will hereinafter become apparent. Of course, the electrical coil connections are brought out to the pins 41 and the fine wire is soldered to these structures with the anchoring relationship preventing fracture of the delicate interconnections.

First, considering the erase head, it may be noted that a pair of mated castings 61 and 63 are adapted for abutting engagement with the locating pins, such as 65, provided to seat in the apertures, such as 67. When these two castings 61 and 63 are assembled together they comprise the erase head section 37 which includes the components next to be described.

A folded over substantially U-shaped pole piece 71 is provided to comprise a plurality of magnetic flux paths. The pole piece 71 is made of folded over highly permeable magnetic material and is accurately formed by punch and die techniques. It includes an upper neck portion 73 which is peripherally accurately slotted or recessed at 75 and 77 in the upper fold portion. Below the neck portion 73, a tapered shoulder 79 extends to a planar surface or leg 81 which is inturned, as illustrated by the reach or leg 83, and then forms the right angle or depending flanges 85. The shoulder 87, between the planar leg 81 and the inturned reach or leg 83, is significant to the indexing structure.

The folded over pole piece 71 is adapted to fit within conforming recesses in the respective castings 61 and 63. For example, each shoulder 87 is adapted to seat on the respective ridges or flanges 87′ with the planar legs disposed in the recesses 81′ and the tapered shoulder fitting the tapered wall 79′ of the overall recess and with the neck 73 seated against the horizontal reach 73′ of the overall recess. At least the peripheral portion of the upper surface 91 of the pole piece 71 seats against the shoulder formed by flange 91′, such that the pole piece is positively oriented and indexed to the mated castings.

When viewed externally, each casting 61 and 63 exhibits a neck portion 101 and a decided shoulder 103. The neck portion is hollow when the castings 61 and 63 are mated, so that the upper internal structure of the erase section will be visible to the operative face 15 of the head 11.

The pole piece structure further includes the elongated magnetic shims 105 and 107 which are adapted to extend through the upper slots 75 and 77 and to be gripped or clamped by the depending flanges 85. In order to form the dual double gaps for the erase head, nonmagnetic spacers, shown as the U-shaped copper members 109 and 111, are adapted to fit around the upper extremities of the magnetic pole piece shims 105 and 107 to separate the latter from the pole piece folded over U-shaped member 71. A pair of electrical coils 113 and 115 respectively fit on the magnetic pole piece shims 105 and 107.

Thus, when the described components are assembled and tightly gripped by the castings 61 and 63, which are abutted together, the erase section is formed. This section is recessed, to be anchored by the terminal board 51, through tracks 117 and 119 formed in the depending peripheral flanged portions 121 and 123 of the casting housings 61 and 63.

The read-record section is also best shown in FIG. 2, wherein the mated castings 201 and 203 are adapted for abutting engagement to comprise this section. It may be observed that the pole piece structure 205 (for in all) comprises and offset leg or portion 207, a horizontal leg or portion 209 at right angles thereto, a vertical or riser portion 211 and an angular portion 213. It is this latter portion that is finished off to comprise the pole faces 215. In any event, the castings 201 and 203 are formed with conforming recesses to receive the pole piece portions 209, 211 and 213 to orient and hold the same. The angular portions 213 of the pole pieces 205 terminate in the hollow ridges 221 which art provided to form the read-record gaps in predetermined accurately spaced apart relation.

Each read-record casting 201 and 203 includes a vertical slot 223 into which a magnetically isolated shim 225 is adapted to fit between the electric coils 227. The coils receive the offset portions 207 of the pole pieces which are adapted for abutting engagement therein and the joint is closed by the magnetic shims 229 which are contained within the coils 227.

The castings 201 and 203 include the depending flange peripheral portions 201′ an 203′. These portions form the tracks 231 which are adapted to receive the opposing edges 53 and 55 of the terminal board 51 for anchoring the read-record section.

With the pole pieces assembled in the read-record housings the subsassembly is finished off by lapping to a planar relation for the abutting engagement. Actually eight points or areas are lapped to form the plane. These include the pole faces 215 with their continguous supporting edges of the ridges 221, the slightly raised annular pin receiving apertures 241, the exposed surfaces 207' of the pole pieces and the track abuttments 243. Most of these supports are shown somewhat exaggerated in order to emphasize the lapping areas, but they do protrude to permit lapping to a common plane.

When all four pole pieces 205 and both read-record housing sections or castings 201 and 203 are properly lapped, they are assembled together in abutting engagement with the nonmagnetic foil inserts 245 and the pins 242 abutting with the apertures of the annular portions 241 disposed betweent he pole pieces faces 215 to provide the read-record gaps. Of course, electric connection is made to the coils 227 from the terminals 41 after the components are anchored.

Figures 3, 4, 5:
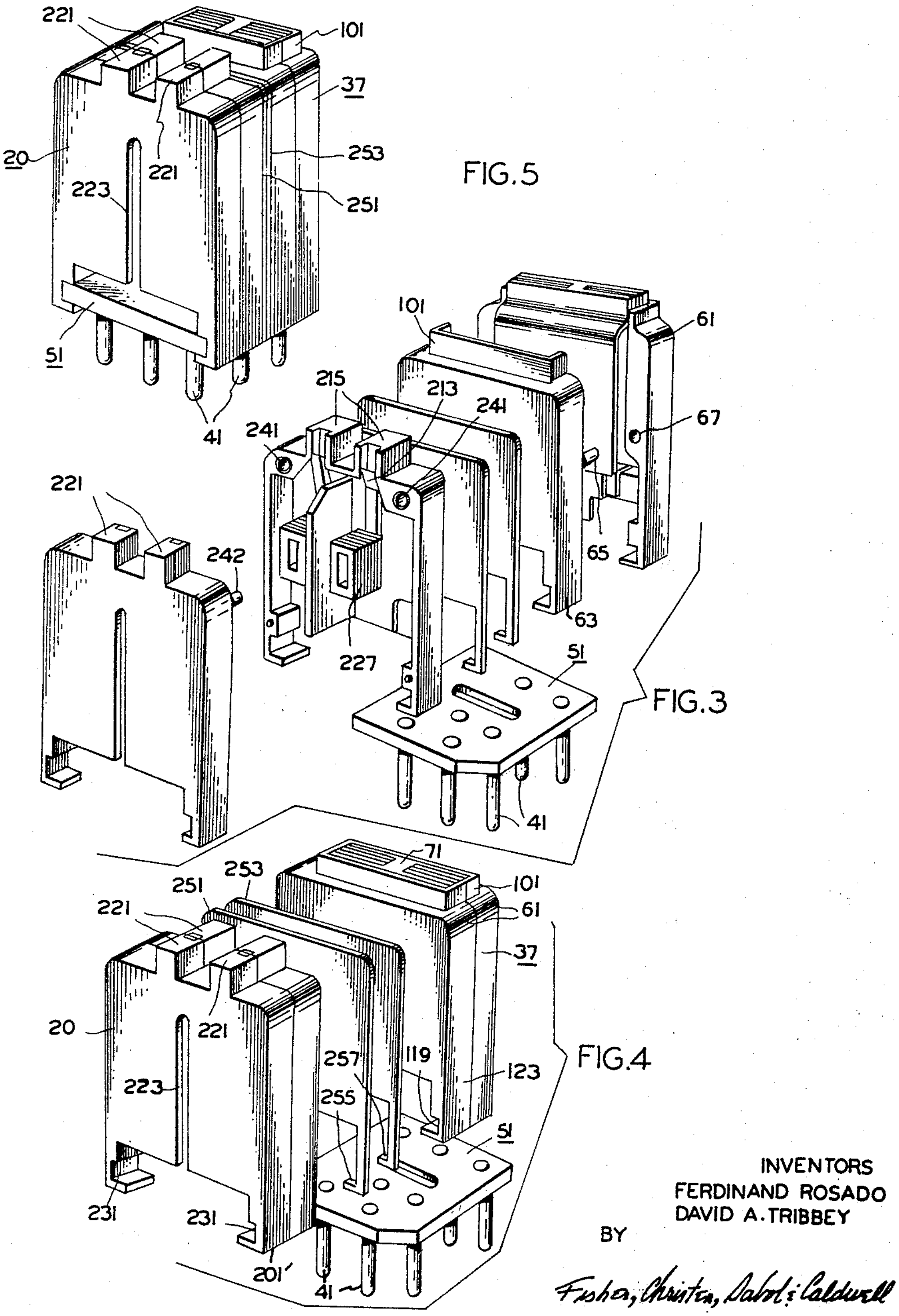
FIG. 3 is an exploded view similar to FIG. 2 but with certain components assembled.
FIG. 4 shows both the read-record section and the erase section fully internally assembled with the two sections in position for assembly.
FIG. 5 shows the total subassembly of the two sections adapted for enclosure by the outer casing.

In FIG. 4 both the erase head section 37 and the read-record section 20 are shown fully assembled and ready for indexing together, relative to the anchoring terminal board 51. A magnetic isolating plate or shim 251 along with an electrically insulating plate or shim 253 are disposed between the read-record section 20 and the erase section 37 before the sections are engaged with the terminal board 51. Each of the shims 251 and 253 includes inturned lower extremities 255 and 257 for gapping the terminal board 51 with the plates being held in position by the continguous relation of the sections 20 and 37 as seen in FIG. 5. It may also be seen in FIG. 5 that the sections 20 and 37 are positioned by the terminal board 51 which provides an indexing of the gap of the terminals 41 to the gaps formed by these sections.

The subassembly of FIG. 5 is adapted snuggly to fit within the casing 13 of FIG. 1 to permit the ridges 221 of read-record section 20 and neck 101 of erase section 37 to project through the slots 17, 19 and 39 respectively. Thus, it may be appreciated that the pins 41 are indexed to the gaps which in turn are indexed to each other in all determinations. The head 11 is then completed by finishing off the operative face 15.

While the preferred embodiment of the invention is illustrated and described, nevertheless it will occur to those skilled in the art from a reading of the description of this invention that other modifications and embodiments may be readily constructed. Therefore, it is intended that the scope of this patent will be limited only by the appended claims wherein:

What is claimed is:

1. A combination magnetic head comprising an outer casing having an operative face including at least one longitudinal slot and a slot transverse to said longitudinal slot, said slots being in precise predetermined relative orientation; an erase head housing including a neck portion having at least one erase gap disposed therein, said neck portion being adapted to index precisely to said transverse slot to dispose said erase gap in said operating face; a read-record housing including at least one hollow ridge portion having a read-record gap disposed therein, said hollow ridge portion being adapted precisely to index to said longitudinal slot to expose the read-record gap at said operative face in predetermined orientation to said erase gap; said casing being adapted snugly to contain the erase housing and the read-record housing in said orientation; said casing being open along a surface other than said operative face; a terminal board common to said erase head housing and said read-record housing and adapted to anchor said housings in the recited orientation by supporting said housings in the recited positions while substantially closing the open surface of the casing; and a filling incapsulating the housings and terminal board in the casing.

2. The combination head of claim 1 wherein each of said housings is recessed to form a track for receiving the terminal board for effecting the anchoring of the sections therefrom.

3. The combination head of claim 2 wherein each of said housings includes depending flange-like portions along the outer peripheries which include the track recesses along the inner surfaces thereof to receive the terminal board and wherein at least said flange-like portions bear against the interior of the casing in the region of the open surface thereof in conjunction with peripheral portions of the terminal board not received in the recesses for maintaining the predetermined indexing of the gaps.

4. A combination magnetic head comprising an outer casing of magnetic material having an operative face including a plurality of parallel spaced longitudinal slots and a transverse slot spaced from said longitudinal slots in precise predetermined relative orientation; an erase head enclosure including a neck portion having a plurality of erase gaps disposed therein, said neck portion being indexed precisely to said transverse slot to dispose said erase gaps at said operating face; a read-record enclosure including a plurality of hollow ridge portions, each having a read-record gap disposed therein, said hollow ridge portions being indexed precisely to said plurality of longitudinal slots to expose said read-record gaps at said operative face in predetermined orientation to said erase gap; said casing being adapted snugly to contain the erase head enclosure and the read-record enclosure in said orientation; said casing being open opposite said operative face; a terminal board common to said erase head enclosure and said read-record enclosure adapted to orientate said enclosures in the recited orientation by supporting the enclosures in the recited positions while substantially closing the opening of the casing; and a filling incapsulating the enclosures and terminal board in the casing.

5. The combination head of claim 4 wherein each of said enclosures includes depending peripheral portions which are recessed to receive the terminal board for effecting the supporting of the enclosures therefrom.

6. The combination head of claim 4 wherein said read-record enclosure includes a pair of mated semi-enclosures, each of said semi-enclosures having parts of said plurality of hollow ridge portions disposed thereon and each of said semi-enclosures having a planar side with a longitudinal slot therein, a magnetically isolated shim supporting a pair of electric coils on either side thereof and adapted to be inserted in the slots in said planar sides, a pair of pole structures each associated with one of said electric coils and disposed in said semi-enclosures so as to extend into said hollow ridges, and a nonmagnetic foil insert associated with each pole structure to define said read-record gaps.

7. The combination as recited in claim 4 wherein said erase head enclosure includes a pair of mated semi-enclosures each of said semi-enclosures having part of said neck portion disposed thereon, a generally U-shaped pole structure having a slotted end adapted to extend into said neck portion and a pair of flanged legs, a pair of magnetic shims having electric coils wound therearound, said shims being inserted in parallel spaced relationship between said slotted end and said flanged legs of said pole structure, and a pair of U-shaped nonmagnetic spacers inserted between said magnetic shims and said slotted end of said pole structure to define said plurality of erase gaps.

8. A magnetic transducer capable of read-record and erase functions comprising in combination a read-record enclosure comprising a pair of semi-enclosures adapted to be mated to form said enclosure; at least one ridge on the upper surface of each semi-enclosure adapted for opposed relation in the enclosure; each semi-enclosure including a recess extending into said ridge; a pole piece adapted to fit within each recess; gap forming means disposed between the upper opposed edges of the pole pieces; electrical coil means disposed on the pole pieces away from the gap forming edges; a common terminal board;

said enclosure including tracks to receive opposed edges of the terminal board to position the enclosure thereon; a pair of erase head semi-housings adapted for abutting engagement to comprise a housing; an erase pole piece comprising a substantially U-shaped member having in-turned extremeties forming opposed shoulders; each of said semi-housings being recessed to receive a leg of the U-shaped pole piece and each including a ridge for engagement with a shoulder thereof; the arcuate portion of said pole piece being slotted to receive at least one elongated magnetic shim adapted to be clamped by said in-turned extremeties; non-magnetic spacer means disposed substantially around the elongated magnetic shim at the slotted region of the pole piece to form a double gap; said housing including tracks engageable with said outer edges of the terminal board; electrically insulated and magnetically isolating separating means deployed between said housing and said enclosure and supported by the terminal board; a box like magnetic shield open along one surface thereof and slotted at the opposed surface thereof adapted to fit snuggly over said housing, enclosure and terminal board with the erase double gap and the read-record gap penetrating the slotted surface thereof in exact pre-determined alignment; electrical connections extending from the coil means to the terminals of the terminal board; and incapsolating material filling the shield.

9. A combination magnetic heat comprising an outer casing of high permeable material having an arcuate operative face which includes a pair of spaced apart longitudinally extending coterminus slots and a transverse slot spaced uniformally from and symmetrically to the longitudinal slots; said casing having an open side opposite the operative face; a common terminal board adapted to fit within said open side; a read-record section comprising mated semi-enclosures in abutting engagement along a common plane, said semi-enclosures including a pair of spaced apart raised hollow ridges, each semi-enclosure being substantially in conformity with pole piece configurations recessed at spaced apart positions with the recesses being in communication with the hollow ridges respectively; pole pieces within said recesses adapted for abutting engagement when the semi-enclosures are mated; non-magnetic foil between the pole pieces at the ridges; electric coil means disposed on the pole pieces and contained within the mated enclosure; magnetic isolation means extending across said mated enclosure to isolate the mated pole piece; said mated enclosure including grooves near its end remote from the ridges to receive opposed edges of the common terminal board; an erase section comprising a pair of mated semi-enclosures adapted for opposed engagement along a common plane; each of said semi-enclosures being recessed internally; a pole piece of folded magnetic material adapted to fit said recesses, said pole piece being slotted at spaced apart positions corresponding to the spacing of said ridges; a pair of elongated magnetic shims extending through the slots at one end of the pole piece and clamped between the folded over pole piece material near the opposite end thereof; electrical coil means carried by the elongated shims intermediate their ends; said erase enclosure being recessed near its end opposite the opening to receive said opposed edges of the common terminal board; non-magnetic material substantially encomposing the shims of the pole piece to form double spaced apart gaps; means interposed between the erase section and the read-record section for electrically and magnetically isolating the sections; said sections being disposed on the terminal board in contiguous relation with the said interposed means; said sections in connection with said terminal board being dimensioned to fit snuggly within said case via the open side thereof to dispose the erase section gaps at spaced apart locations in the transverse slot of the operative face and the read-record gaps at the longitudinal slots, respectively of the operative face and in precise predetermined positions with respect to gap heighth, azimuth and alignment.

References Cited

UNITED STATES PATENTS

| | | | |
|---|---|---|---|
| 2,668,878 | 2/1954 | Munroe | 179—100.2 |
| 3,211,843 | 10/1965 | Dundovic, et al. | 179—100.2 |

BERNARD KONICK, *Primary Examiner.*

J. R. GOUDEAU, *Assistant Examiner.*